United States Patent
Krahn

(10) Patent No.: US 10,062,481 B2
(45) Date of Patent: Aug. 28, 2018

(54) ELECTRICAL CONDUCTOR INSULATION SYSTEM AND METHOD OF FABRICATION

(71) Applicant: GENERAL ELECTRIC COMPANY, Schenectady, NY (US)

(72) Inventor: John Raymond Krahn, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 378 days.

(21) Appl. No.: 14/809,377

(22) Filed: Jul. 27, 2015

(65) Prior Publication Data

US 2017/0032873 A1   Feb. 2, 2017

(51) Int. Cl.
| | |
|---|---|
| H01B 17/16 | (2006.01) |
| F04B 17/04 | (2006.01) |
| H01B 3/04 | (2006.01) |
| H01B 13/06 | (2006.01) |
| H01B 3/54 | (2006.01) |
| H01F 41/12 | (2006.01) |
| H02K 44/06 | (2006.01) |

(52) U.S. Cl.
CPC ............ *H01B 17/16* (2013.01); *F04B 17/04* (2013.01); *F04B 17/046* (2013.01); *H01B 3/04* (2013.01); *H01B 3/54* (2013.01); *H01B 13/06* (2013.01); *H01F 41/127* (2013.01); *H02K 44/06* (2013.01)

(58) Field of Classification Search
CPC ................................... H02K 3/28; H02K 7/06
USPC .................... 310/43, 214, 215, 213
See application file for complete search history.

(56) References Cited

U.S. PATENT DOCUMENTS

| | | | |
|---|---|---|---|
| 491,708 A | * | 2/1893 | Jefferson ........................ 310/267 |
| 2,416,143 A | | 2/1947 | Berberich |
| 2,479,357 A | | 8/1949 | Hill et al. |
| 2,772,696 A | | 12/1956 | Schneider et al. |
| 2,917,570 A | * | 12/1959 | Wolff et al. ................... 174/120 |
| 2,970,936 A | | 2/1961 | Richardson |
| 3,026,222 A | | 3/1962 | Rogers, Jr. et al. |

(Continued)

FOREIGN PATENT DOCUMENTS

| | | |
|---|---|---|
| CN | 201535258 U | 7/2010 |
| EP | 0271611 B1 | 6/1988 |

(Continued)

OTHER PUBLICATIONS

McKinstry, Thermal Expansion of Clay Minerals, The American Mineralogist, vol. No. 50, pp. 212-222, Jan. 1965.

(Continued)

*Primary Examiner* — Burton Mullins
(74) *Attorney, Agent, or Firm* — GE Global Patent Operation; Pabitra Chakrabarti

(57) ABSTRACT

An insulation system includes a number of mica hard-boards joinable to form a free-standing slot-liner for insulating a conductor when placed therein and accommodating an expansion of the conductor. In another embodiment, an electromagnetic pump includes a stator of the electromagnetic pump including a number of laminations, a slot-liner positioned within a gap formed by the laminations, an annular wound copper conductor coil positioned within the slot-liner. The slot-liner includes a number of mica hard-boards joined to form an annular volume for insulating the conductor coil and accommodating an expansion of the conductor coil.

16 Claims, 6 Drawing Sheets

(56) References Cited

U.S. PATENT DOCUMENTS

| | | | |
|---|---|---|---|
| 3,055,084 A | | 9/1962 | Canegallo |
| 3,214,614 A | * | 10/1965 | Maeder .......................... 310/11 |
| 3,777,198 A | | 12/1973 | Anderson et al. |
| 4,160,926 A | | 7/1979 | Cope et al. |
| 4,562,164 A | | 12/1985 | Miyazaki et al. |
| 4,652,218 A | | 3/1987 | Tsutsui et al. |
| 5,300,844 A | | 4/1994 | Schuler |
| 5,332,939 A | | 7/1994 | Fanning et al. |
| 5,530,308 A | | 6/1996 | Fanning et al. |
| 5,636,434 A | | 6/1997 | Okey et al. |
| 7,015,396 B2 | | 3/2006 | Wada et al. |
| 2011/0148245 A1 | | 6/2011 | Wang et al. |

FOREIGN PATENT DOCUMENTS

| | | | | |
|---|---|---|---|---|
| EP | 0839402 B1 | | 4/1999 | |
| GB | 568071 A | | 3/1945 | |
| GB | 690538 A | * | 4/1953 | ............... H02K 3/24 |

OTHER PUBLICATIONS

International Search Report and Written Opinion issued in connection with corresponding PCT Application No. PCT/US2016/043988 dated Sep. 27, 2016.

Wichmann, A. et al., "Statistical evaluation of accelerated voltage endurance tests on mica insulation for rotating electrical machines", Electrical Insulation, IEEE Transactions on , pp. 319-323, vol. 25, Issue: 2, Apr. 1990.

\* cited by examiner

US 10,062,481 B2

ELECTRICAL CONDUCTOR INSULATION SYSTEM AND METHOD OF FABRICATION

STATEMENT REGARDING FEDERALLY SPONSORED RESEARCH & DEVELOPMENT

This invention was made with Government support under contract number DE-NE0000613 awarded by the United States Department of Energy. The Government has certain rights in the invention.

BACKGROUND

The present invention relates generally to insulation systems and more particularly to insulation systems for conductor coils of electrical machines used in high temperature environments.

An electromagnetic pump typically comprises a core having a plurality of lamination teeth and conductor coils placed in the slots located between the lamination teeth. Insulation material for conductor coils in electromagnetic pumps used in high temperature environments must provide adequate heat resistance. In traditional designs of insulation systems for electrical annular linear induction pumps, for example, conductor coils are typically dry-wrapped with tape. Taped insulation may fry or crack under certain conditions and may not withstand the expected designed life of a pump without suffering degradation from conductor coil movements and/or environmental conditions of the pump.

There is need of new designs that do not have the limitations of the dry-wrapped systems.

BRIEF DESCRIPTION

In accordance with one aspect of the invention, an insulation system comprises a plurality of mica hard-boards joinable to form a free-standing slot-liner for insulating a conductor when placed therein and accommodating an expansion of the conductor.

In accordance with another aspect of the invention, an electromagnetic pump, comprises a stator of the electromagnetic pump comprising a plurality of laminations; a slot-liner positioned within a gap formed by the plurality of laminations; an annular wound copper conductor coil positioned with in the slot-liner, wherein the slot-liner comprises a plurality of mica hard-boards joined to form an annular volume for insulating the conductor coil and accommodating an expansion of the conductor coil.

In accordance with another aspect of the invention, a method of insulating a conductor coil comprises positioning a bottom mica hard-board having a first outer circular perimeter and a first inner circular perimeter defining a first central hole, positioning an inner wall mica hard-board about the first inner circular perimeter; positioning an outer wall mica hard-board about the first outer circular perimeter; positioning a conductor coil over the bottom mica hard-board; positioning a top mica hard-board having a second outer circular perimeter and a second inner circular perimeter defining a second central hole so as to define a free-standing slot-liner comprising the bottom, inner wall, outer wall, and top mica hard-boards.

DRAWINGS

With reference now to the figures wherein like elements are numbered alike:

DETAILED DESCRIPTION

Figure 1:
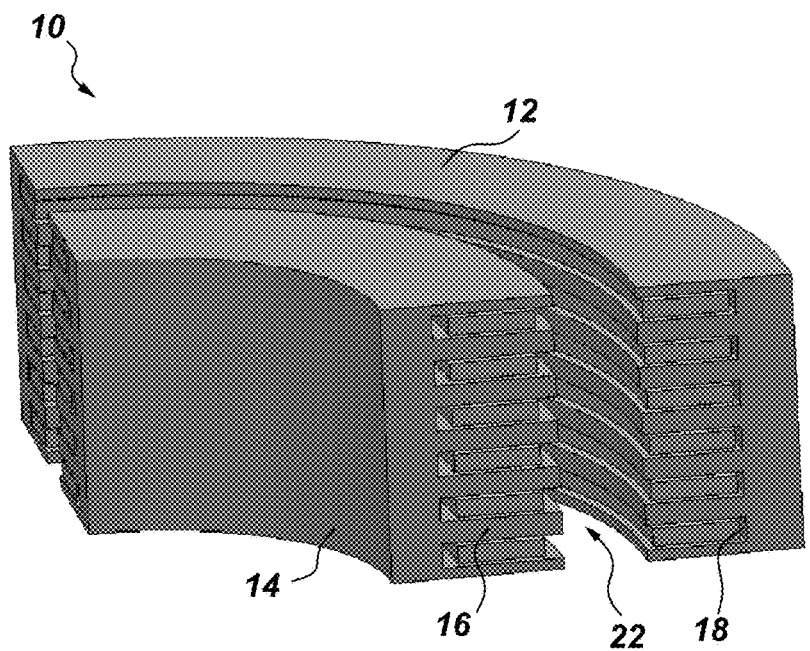
FIG. 1 is a perspective view of a pole section of a sodium pump.

In the following description, like reference characters designate like or corresponding parts throughout the several views shown in the figures. It is to be noted that the terms "first," "second," and the like, as used herein, do not denote any order, quantity, or importance, but rather are used to distinguish one element from another. The terms "a" and "an" do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity).

FIG. 1 represents a cut-away three-dimensional view of a pole section 10 of an electrical annular linear induction pump, which in one embodiment comprises an electromagnetic sodium pump. Pole section 10 includes an outer stator 12 and an inner stator 14. In operation, molten sodium flows through the annular gap 22 between the two stators 12 and 14. Each of the stators 12, 14 comprise a number of lamination segments 16 designed to house a number of insulated conductor coils 18.

Figure 2:
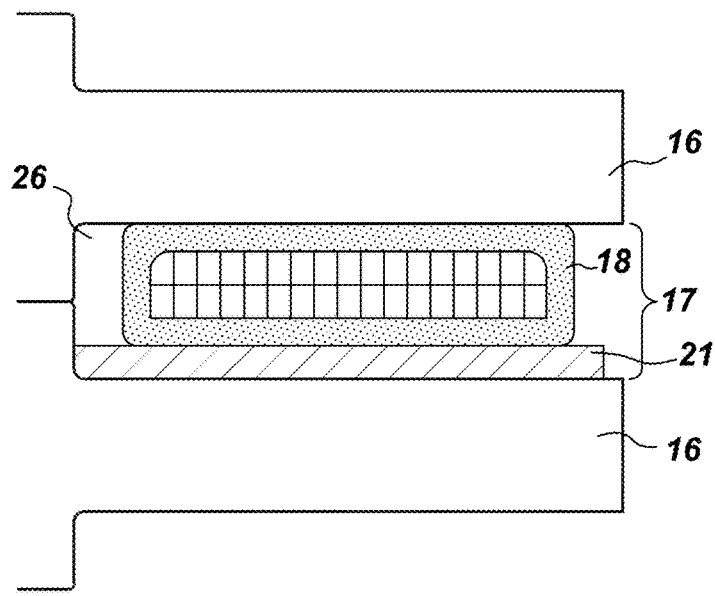
FIG. 2 is a cross-sectional view of stacking of lamination segments and a conductor coil of a sodium pump.

FIG. 2 is a cross-sectional view of lamination segments 16 and insulated conductor coils 18 alternately stacked. As is seen in FIG. 2, conductor coils 18 are positioned in the gaps 17 between two adjacent lamination segments 16. Conventional insulation systems typically employ conductor coils made of copper windings dry-wrapped with tapes 19. When heated, such conductor coils typically expand in all dimensions. In annular embodiments, most of the expansion happens in the radial direction. In one earlier embodiment, a native mica sheet 21 was inserted between the bottom lamination segment 16 and the insulated conductor coil 18. The native mica sheets were intended to reduce friction between the insulated conductor coils and the lamination segments. In accelerated testing, it has been found that these native mica sheets tend to slide with the insulated conductor coils and can wear through over time.

Figure 3:
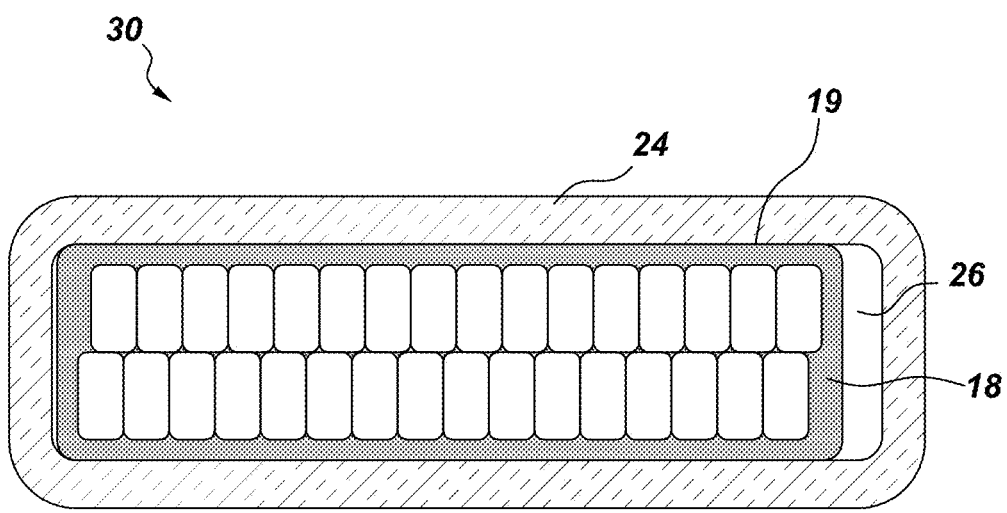
FIG. 3 is a block diagram of a slot-liner based insulation system representing one embodiment of the present invention.

FIG. 3 is a cross-sectional view of a slot-liner based insulation system 30 representing one embodiment of the present invention. In accordance with inventive embodiments disclosed herein, mica hard-boards are used to form a free-standing slot-liner 24 for insulating a conductor 18 (shown as a conductor coil, made up as a package of a number of strands for purposes of example) placed therein. During operation, as the temperature increases, the conductor coil 18 typically expands. The expansion in the vertical direction is typically less than the expansion in the radial direction. The relatively minor expansion in the vertical direction does not interfere with the integrity of the slot-liner 24 and in fact is useful for helping to wedge the slot-liner 24 more tightly between the laminations 16. The more significant expansion in the axial direction may be accommodated by leaving spaces 26 between the insulated conductor coil 18 and the slot-liner 24.

The conductor coil 18 typically comprises copper. Other conductor coil materials may include copper beryllium and titanium clad copper, for example. In the embodiment of FIG. 3, the conductor comprises an annual wound conductor coil having two rows. However, the present invention is not limited to a specific conductor shape or winding arrangement. Furthermore, FIG. 3 illustrates an embodiment wherein the conductor coil 18 is wrapped with a compliant tape 19 such as mica and fiberglass tape or a ceramic fiber tape for enhanced structural integrity.

The conductor coil 18 typically changes its position within the insulation system in response to increased temperature. Specifically, in a colder, start-up condition, the conductor coil 18 is typically near the inner radius side of the slot-liner as shown in FIG. 3. Then during operation, as temperature increases, the conductor coil 18 expands and is pushed out closer toward the outer radius side of the insulation (right hand side of FIG. 3). As compared with conventional dry-wrapped tape embodiments, the slot-liner 24 is better able to withstand expansions of the conductor coil 18.

Figure 4:
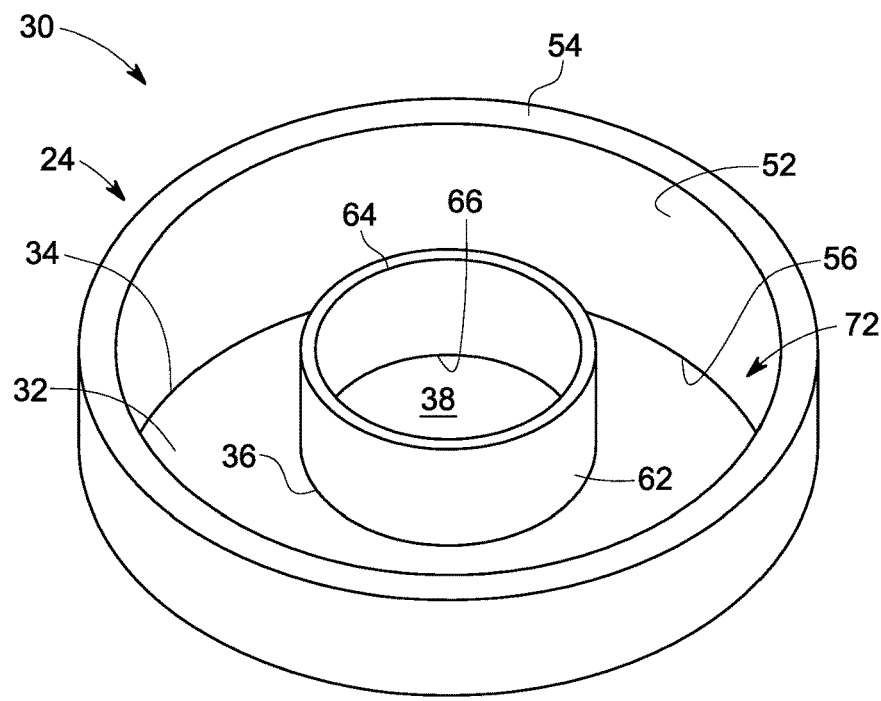
FIG. 4 is a perspective view of the slot-liner based insulation system of FIG. 3 with an unattached top mica hard-board.
Figure 5:
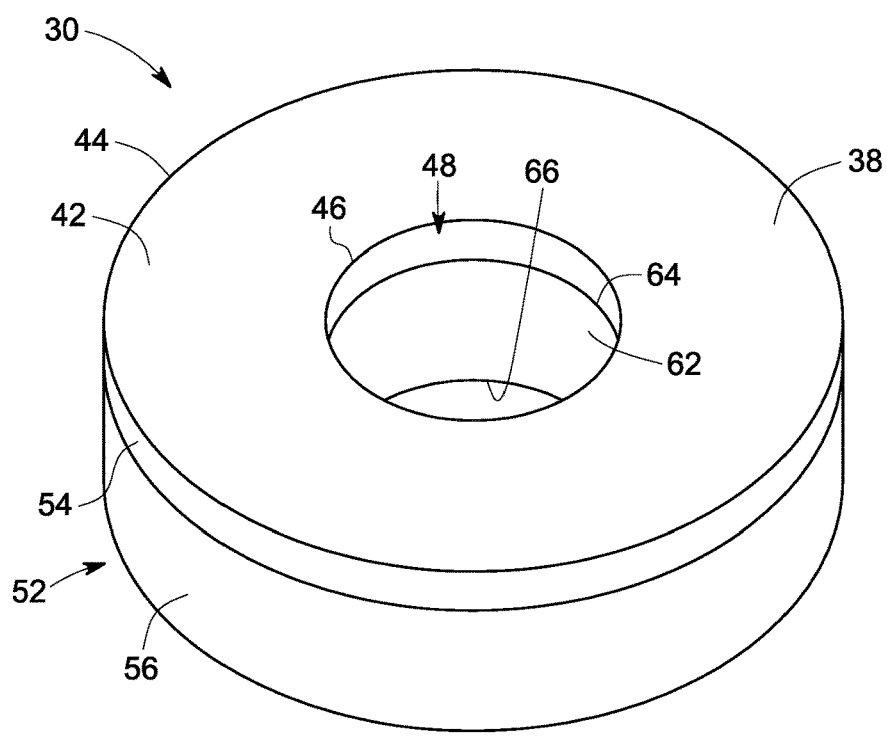
FIG. 5 is a perspective view of the slot-liner based insulation system of FIG. 5 with the top mica hard-board attached.
Figure 7:
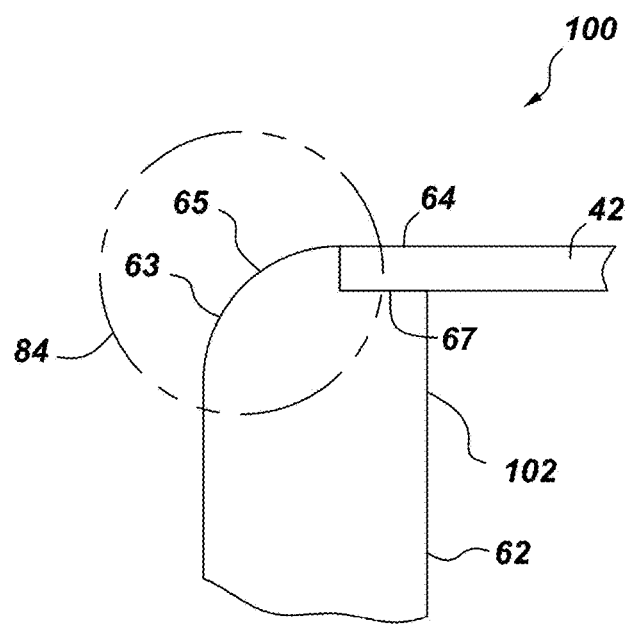
FIG. 7 is a side view of another embodiment of a joint of the slot-liner based insulation system of FIG. 3.

FIGS. 4 and 5 are perspective views of the slot-liner based insulation system 30 respectively without and with a top mica hard-board attached. As is shown in FIG. 4 and FIG. 5, a number of mica hard-boards are used to construct the slot-liner 24. In one embodiment, the mica hard-boards comprise: a bottom mica hard-board 32 comprising a first outer circular perimeter 34 and a first inner circular perimeter 36 defining a first central hole 38, a top mica hard-board 42 comprising a second outer circular perimeter 44 and a second inner circular perimeter 46 defining a second central hole 48, an outer wall mica hard-board 52 comprising a first upper circular perimeter 54 and a first lower circular perimeter 56 and joining the first and second outer circular perimeters 34, 44, and an inner wall mica hard-board 62 comprising a second upper circular perimeter 64 and a second lower circular perimeter 66 and joining the first and second inner circular perimeters 36, 46. In the embodiment of FIG. 4, the outer and inner wall mica hard-boards 52, 54 comprise concentric cylinders, and the top and the bottom mica hard-boards 42 and 32 are arranged in parallel positions so that the central holes 38 and 48 are substantially aligned with each other. For holes to be "substantially aligned" the holes need not be identical depending upon how the outer and inner wall mica hard-boards are arranged. For example, the hole 48 (FIG. 5) in the top mica hard-board 42 (FIG. 5) may have a slightly larger radius if the second inner circular perimeter 46 (FIG. 5) is designed to rest on an inner portion 67 of the inner wall mica hard-board 62 (as shown in FIG. 7, for example).

In one exemplary embodiment, the mica hard-boards comprise monolithic hard-boards made of silicon bonded phlogopite mica or large flake mica. An exemplary monolithic mica hard-board for the bottom and top mica hard-boards 32 and 42 of the system described herein typically comprises a single-layer, flat, rigid material without any other intervening material or reinforcement. An exemplary monolithic mica hard-board for the outer and inner wall mica hard-boards 52, 62 of the system described herein typically comprises a single-layer, curved (as shown in FIGS. 4 and 5) or flat (not shown, but applicable in linear embodiments), rigid material. By using mica hard-board material, in contrast to conventional dry-wrapped tape systems with or without a native mica sheet underneath, the insulation system may be configured to operate within a temperature range of 400° C. to 600° C., for example.

The mica hard-boards 32, 42, 52, 62 have dimensions thick enough to withstand the voltage stress and thin enough to enable heat transfer from the conductor coils to the lamination segments. In one embodiment, for example, the thickness of the top and bottom mica hard-boards ranges from about 2 mm to about 4 mm. In a more specific embodiment, the thickness of the top and bottom mica hard-boards ranges from about 2 mm to about 2.5 mm. In another embodiment of the invention, the thickness may be as low as 1 mm. Due to the structural location of the inner and outer wall mica hard-boards typically resulting in compression during pump operation and the fact that the mica fibers are typically positioned in a different orientation when forming cylinders, the thickness of the inner and outer wall mica hard-boards is typically thicker than that of the top and bottom mica hard-boards. In one example, the thickness of the inner and outer wall mica hard-boards is about 0.25 inches (6.35 mm).

Referring back to FIGS. 3 and 4, in one embodiment, the bottom mica hard-board 32, the top mica hard-board 42, the outer wall mica hard-board 52, and the inner wall mica hard-board 62 complete a free-standing structure of the slot-liner 24. In other words, the slot-liner 24 can stand on its own on a reasonably flat ground without any external support. For this embodiment, it is useful for the bottom mica hard-board 32 to support the outer and inner wall mica hard-boards 52 and 62 with at least a partial overlap. Similarly, it is useful for the outer and inner wall mica hard-boards 52 and 62 to support the top mica hard-board 42 with at least a partial overlap. Further, as discussed with respect to FIG. 3, sufficient space is provided for in the form of an annular space 72 between the outer wall mica hard-board 52 and the inner wall mica hard-board 62 to house the conductor coil 18. One such complete slot-liner 24 with a conductor coil 18 may be housed in an interlocked manner in the gap 17 between two blocks of the lamination segments 16 of FIG. 1 and FIG. 2, for example.

Figure 6:
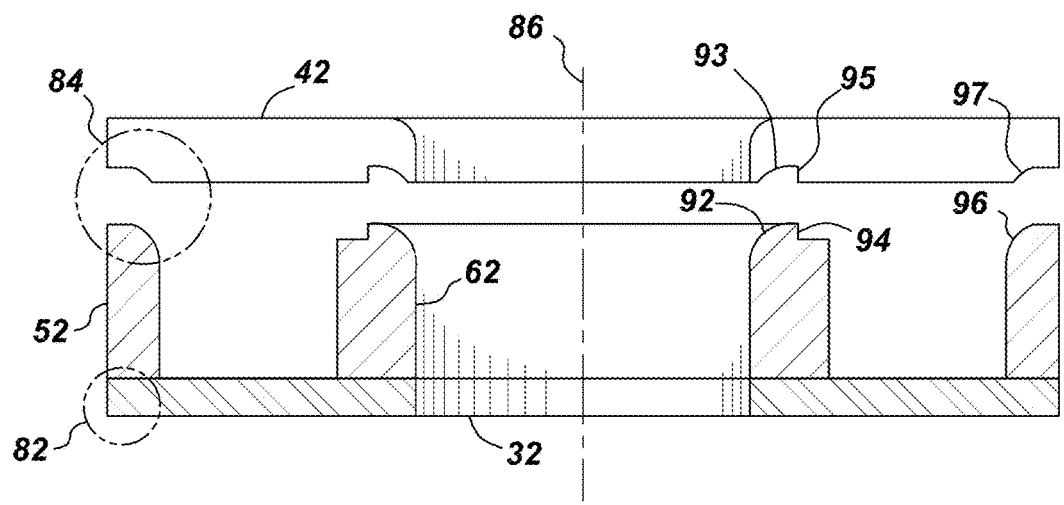
FIG. 6 is a cross-sectional view of one embodiment of a joint of the slot-liner based insulation system of FIG. 3.

In reference to FIG. 6, returning to the construction of the slot-liner 24, lower joints 82 are formed where the outer and inner wall mica hard-boards 52, 62 and the bottom mica hard-board 32 meet and upper joints 84 are formed where the outer and inner wall mica hard-boards 52, 62 and the top mica hard-board 42 meet. During fabrication, in order to assemble the top mica hard-board 42 over an open slot-liner 24 with the conductor coil 18 (FIG. 3) placed inside, first, the top mica hard-board 42 and its central hole 48 are placed in a parallel position with respect to the bottom mica hard-board 32 and its central hole 38. Then a first upper circular perimeter 54 of the outer wall mica hard-board wall 52 is joined with an outer periphery 44 of the top mica hard-board 42, and a second upper circular perimeter 64 of the inner wall mica hard-board 62 is joined with an inner periphery 46 of the top mica hard-board 42.

As shown in FIG. 6, the outer wall mica hard-board 52 and the inner wall mica hard-board 62 may be cut and machined to join the top mica hard-board 42 at respective free edges in a curved and smoothed joint to eliminate sharp corners at the edge interface. Having the curve on the inner wall mica hard-board is particularly useful when inserting the slot-liner 24 into the inner stator 14 of the electromagnetic pump (FIG. 1) as the inner wall mica hard-board faces the stator. For slot-liners 24 to be inserted into outer stators, the curve is particularly useful on the outer wall mica hard-board. In one embodiment of the invention, the curved and smoothed joint may be a stair-stepped joint at an inner interface to facilitate the top or bottom micro hard-board "clicking" in place during assembly. Having curves and/or stairs is useful to increase the length of the joint and thus increase the length of the creepage path (the path from the conductor).

Referring to FIG. 6, the joints are radially symmetrical with respect to their central axis 86. Referring to the upper joint 82, in one embodiment of the invention, a free edge of the inner wall mica hard-board 62, such as the first (i.e. inner) curved edge 92, is joined with a matching first (i.e. inner) curved edge 93 of the top mica hard-board 42. In a similar manner, a free edge of the outer wall mica hard-board 52, such as the second (i.e. outer) curved edge 96, is joined with a matching second (i.e. outer) curved edge 97 of the top mica hard-board 42. Furthermore, if desired, as also shown in FIG. 6, a stair-stepped edge 94 of the inner wall mica hard-board 62 may be joined with a matching stair-stepped edge 95 of the top mica hard-board 42. In the exemplary embodiment of FIG. 6, only one step has been shown in the stair-stepped edges 48 and 49. However, in other embodiments of the invention, the stair-stepped joints may have more than one step. Furthermore, in some other embodiments (not shown), one or more stairs may be used without the above described curves. Although flat joints 84 are shown with respect to the bottom mica hard-board 32, if desired, curved, stepped, or a combination of curved and stepped joints may be used for the bottom joints 84 as well.

FIG. 7 is a cross-sectional side view 100 of another embodiment of a joint 84 of the slot-liner based insulation system 30 of FIG. 3 showing a segment of the inner wall mica hard-board 62 comprising inner vertical wall surface 102 and second upper circular perimeter 64. In the embodiment of FIG. 7, at least one corner 63 of the inner wall mica hard-board 62 that is facing away from the top and bottom of mica hard-boards 42 and 32 is machined in a curve 65 so that the slot-liner may be more suitably mated and assembled with a corresponding lamination segment 16 of the electro-magnetic pump (FIGS. 1 and 2). Matching of the curvatures facilitates secure positioning of the slot-liner based insulation system 30 into the corresponding lamination segment 16 of the electro-magnetic pump. In the specific embodiment of FIG. 7, the top mica hard-board 42 does not extend over the entire inner wall mica hard-board 62 but instead rests on one or more steps 67 such as those shown in FIG. 6.

Figure 8:
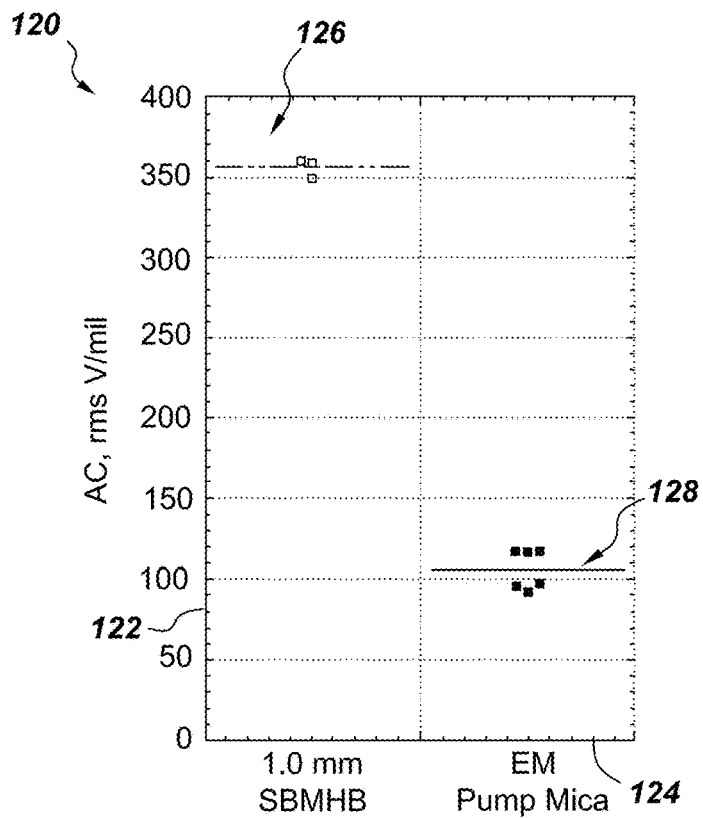
FIG. 8 is a graphical representation of breakdown strength of a slot-liner based insulation system for one thickness of mica hard-boards as compared to a conventional insulation system.

FIG. 8 is a graphical representation of breakdown strength of a slot-liner based insulation system 30 as compared to a conventional insulation system. One of the advantages expected of the slot-liner based insulation system 30 over conventional dry-wrapped systems is superior breakdown strength. The graph 120 includes a vertical axis 122 representing breakdown strength of the insulation system in AC rms V/mil and a horizontal axis 124 representing a particular configuration of an insulation system 30. One cluster of points 126 on the left, top side of the graph signifies a representative break-down strength of about 360 AC rms V/mil of a 1.0 mm thick mica hard-board configuration of the slot-liner 24. Further to the right, bottom corner a second cluster 128 signifies representative break-down strength of about 110 AC rms V/mil of a conventional dry-wrapped tape system.

Figure 9:
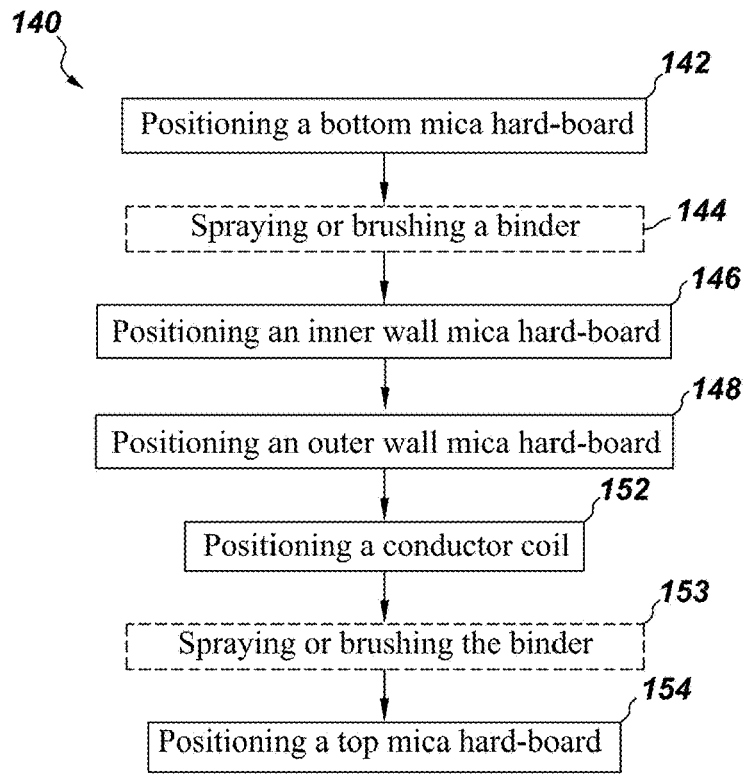
FIG. 9 is a flowchart of a method of making the slot-liner based insulation system of FIG. 3.

FIG. 9 is a flowchart of a method 140 of making a slot-liner based insulation system illustrated in FIGS. 1-7. In step 142, a bottom mica hard-board is positioned. In optional step 144, a binder is applied to the bottom mica hard board. The binder is useful for reducing sliding movements of the conductor coil 18 while expanding and contracting and for filling any cracks or imperfections in joints between the bottom and inner and outer wall mica hard-boards. In one example, the binder comprises a boron nitride compound that is brushed or sprayed on the bottom mica hard-board. In steps 146 and 148, an inner wall mica hard-board and an outer wall mica hard-board are positioned. In embodiments having curved and/or stepped joints on the bottom mica hard-board interface, the curves and/or steps are aligned during the positioning.

At step 152, a conductor coil is poisoned on the bottom mica hard-board. At optional step 153, a binder may be applied to the top mica hard-board on the surface to be attached to the inner and outer wall mica hard-boards. A suitable binder typically fills airspaces inside the hard-boards and therefore increases breakdown voltage. Further, if lubricious, binders improve slippage of the hard-boards and thus reduce wear due to abrasion. In addition, when placed between non-moving pieces and cured in-place, binders may act like glue and hold pieces together. Non-limiting examples of binder materials include boron-nitride, aluminum-nitride and silicon-nitride. Referring to FIG. 9 once more, at step 154, the slot-liner is closed by positioning a top mica hard-board. In embodiments having curved and/or stepped joints on the top mica hard-board interface, the curves and/or steps are aligned during the positioning.

Multiple limitations associated with traditional dry-wound tape insulation systems such as breakdown strength, heat transfer, mechanical integrity, longer life, tolerance for insulation expansion/contraction due to thermal-cycling and/or magnetic forces (axially or radially) are addressed by the slot-liner configuration disclosed herein. Additionally, the disclosed embodiments are cost effective and relatively simple to manufacture in a consistent manner as compared with conventional embodiments.

Figure 10:
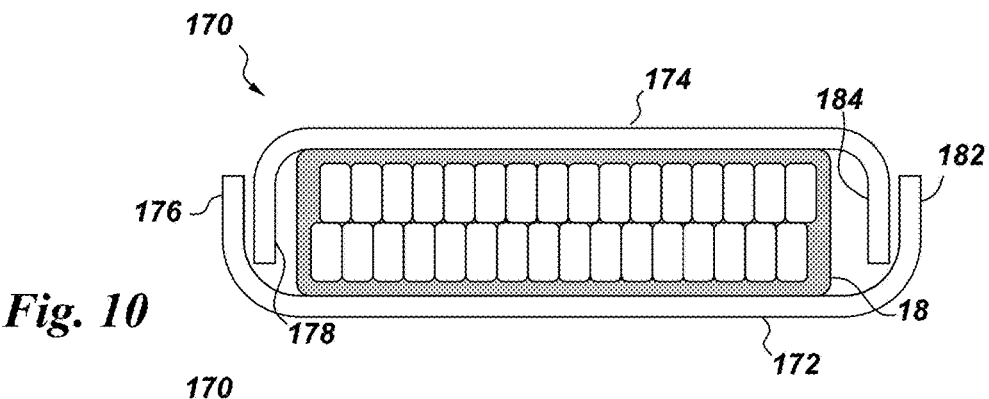
FIG. 10 is a side view of another embodiment of the present invention showing an interleaved arrangement of the slot-liner based insulation system.
Figure 11:
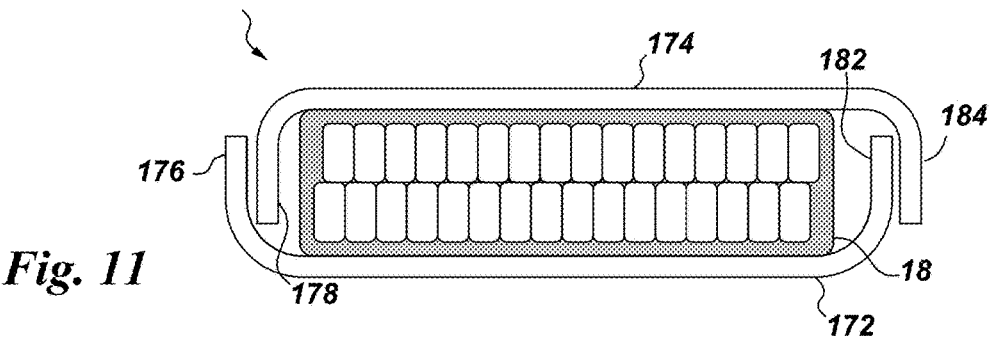
FIG. 11 is a side view of another embodiment of the present invention showing another interleaved arrangement of the slot-liner based insulation system.
Figure 12:
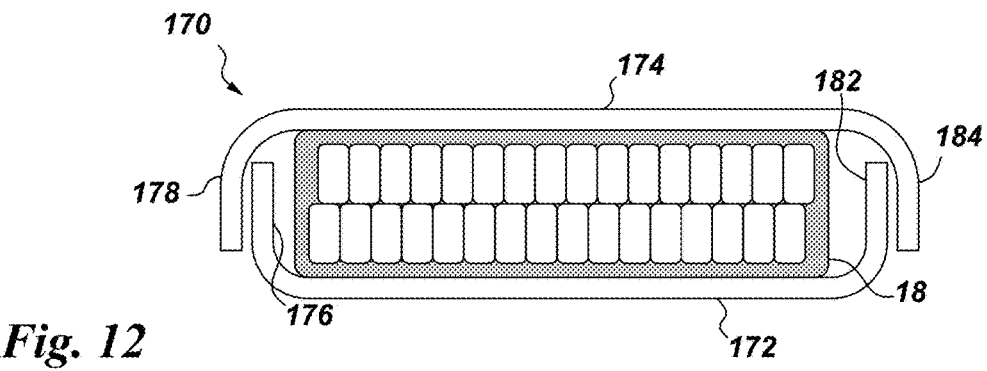
FIG. 12 is a side view of another embodiment of the present invention showing another interleaved arrangement of the slot-liner based insulation system.

FIGS. 10-12 are a cross-sectional view of others embodiment of the present invention showing an interleaved arrangement 170 of the slot-liner based insulation system 30 of FIG. 3 with a typical conductor coil 18 positioned inside. The bottom mica hard-board 172 and the top mica hard-boards 174 are still monolithic for optimum heat transfer. There is an overlap 176 between the inner side 176 of the outer wall mica hard-board (52 of FIG. 3) and the outer sides 178 of the top mica hard-board 174 to allow for any creepage path through the gap between the overlap band. For example, wherein the first and second side surfaces 178 and

Figure 13:
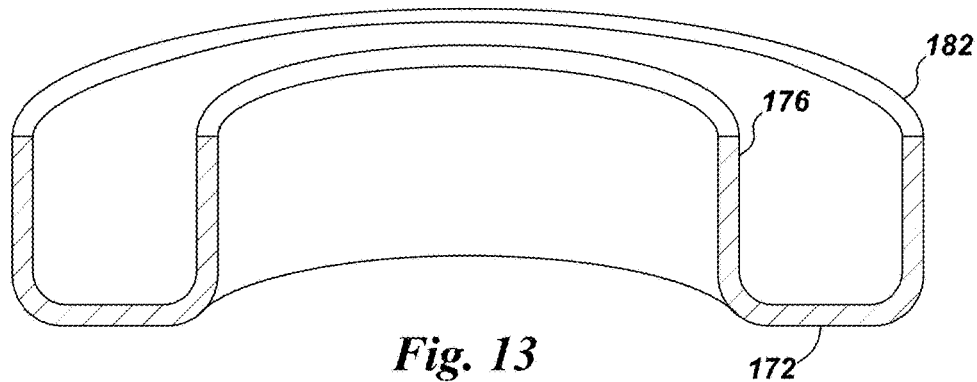
FIG. 13 is a perspective view of the interleaved arrangement of the slot-liner based insulation system of FIG. 11 with its top removed.

184 of the top mica hard-board are at least partially positioned within the first and second bottom side surfaces 176 and 182 in FIG. 10, the first and second top side surfaces 178 and 184 straddle the first and second bottom side surfaces 176 and 182 in FIG. 11 and first and second side surfaces 178 and 184 of the top mica hard-board are at least partially surrounding the first and second bottom side surfaces 176 and 182 in FIG. 12. FIG. 13 is a perspective cut away view of bottom mica hard-board 172.

Compared to the embodiments shown in FIGS. 6 and 7, the embodiments in FIGS. 10, 11, 12 and 13 significantly increase the creepage path and are expected afford higher breakdown voltage. Another advantage of this design is that the mica flakes that comprise the mica hard-boards are typically aligned perpendicular to the electric field, affording increased dielectric withstand capability. In one embodiment, the slot-liner may be fabricated using b-staged materials that are soft and compliant. The initial soft and compliant boards can be formed over a mandrill and then heat-cured to produce the final hard product. This method of production typically improves quality and consistency of the product, as well as minimizes the assembly time. In addition, a binder/filler can be used in the creepage path region (between 176 and 178) for improving the dielectric strength and/or enhancing heat transfer through this area.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspect, can be mixed and matched by one of ordinary skill in the art to construct additional embodiments and techniques in accordance with principles of this application. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

What is claimed is:

1. An insulation system, comprising:
a plurality of monolithic mica hard-boards joinable to form a free-standing slot-liner for insulating a conductor when placed therein and accommodating an expansion of the conductor,
wherein the plurality of monolithic mica hard-boards comprises:
a bottom mica hard-board comprising a first outer circular perimeter and a first inner circular perimeter defining a first central hole;
a top mica hard-board comprising a second outer circular perimeter and a second inner circular perimeter defining a second central hole;
an outer wall mica hard-board joining the first and second outer circular perimeters; and
an inner wall mica hard-board joining the first and second inner circular perimeters,
wherein at least one of the outer and inner wall mica hard-boards have a first thickness, and
wherein at least one of the bottom and top mica hard-boards have a second thickness different from the first thickness.

2. The insulation system of claim 1, wherein at least one of the outer and inner wall mica hard-boards is cut and machined to join the top mica hard-board at a respective edge in at least one of a stair-stepped joint or a curved joint.

3. The insulation system of claim 1, wherein at least one corner of the inner or outer wall mica hard-boards that is facing away from the top or bottom mica hard-boards is curved.

4. The insulation system of claim 1, wherein the plurality of monolithic mica hard-boards comprises a phlogopite mica or a large flake mica.

5. The insulation system of claim 1, wherein at least one mica hard-board of the plurality of monolithic mica hard-boards does not have a reinforcement material.

6. An electromagnetic pump, comprising:
a stator of the electromagnetic pump comprising a plurality of laminations;
a slot-liner positioned within a gap formed by the plurality of laminations;
an annular wound copper conductor coil positioned within the slot-liner,
wherein the slot-liner comprises a plurality of monolithic mica hard-boards joined to form a free-standing slot-liner having an annular volume for insulating the conductor coil and accommodating an expansion of the conductor coil,
wherein the plurality of monolithic mica hard-boards comprises:
a monolithic bottom mica hard-board comprising a bottom surface including a first outer circular perimeter, a first inner circular perimeter defining a first central hole, a first bottom side surface extending perpendicularly from the first outer circular perimeter, and a second bottom side surface extending perpendicularly from the first inner circular perimeter; and
a monolithic top mica hard-board comprising a too surface including a second outer circular perimeter, a second inner circular perimeter defining a second central hole, a first top side surface extending perpendicularly from the second outer circular perimeter, and a second top side surface extending perpendicularly from the second inner circular perimeter,
wherein the first and second top side surfaces are at least partially positioned within the first and second bottom side surfaces, or
wherein the first and second top side surfaces are at least partially surrounding the first and second bottom side surfaces, or
wherein the first and second top side surfaces straddle the first and second bottom side surfaces.

7. The electromagnetic pump of claim 6, wherein the conductor coil comprises copper wrapped in a ceramic fiber tape.

8. The electromagnetic pump of claim 6, wherein an outer wall and an inner wall of at least one of the monolithic bottom mica hard-board and the monolithic top mica hard-board is cut and machined at a respective edge in at least one of a stair-stepped joint or a curved joint.

9. The electromagnetic pump of claim 6, wherein a thickness of at least one of the monolithic bottom mica hard-board and the monolithic top mica hard-board enable heat transfer from the conductor.

10. The electromagnetic pump of claim 6, wherein at least one edge of the mica hard-boards is curved to match a curvature of a corresponding lamination of the electromagnetic pump.

11. The electromagnetic pump of claim 6, wherein the plurality of monolithic mica hard-boards comprises a phlogopite mica or a large flake mica.

12. The electromagnetic pump of claim 6, wherein at least one mica hard-board of the plurality of monolithic mica hard-boards does not have a reinforcement material.

13. A method of insulating a conductor coil comprising:
  positioning a bottom mica hard-board having a first outer circular perimeter and a first inner circular perimeter defining a first central hole;
  positioning an inner wall mica hard-board about the first inner circular perimeter;
  positioning an outer wall mica hard-board about the first outer circular perimeter;
  positioning a conductor coil over the bottom mica hard-board;
  positioning a top mica hard-board having a second outer circular perimeter and a second inner circular perimeter defining a second central hole on the inner and outer wall mica-hard boards so as to define a free-standing slot-liner comprising the bottom, inner wall, outer wall, and top mica hard-boards of a plurality of monolithic mica hard-boards,
  wherein positioning the top mica hard-board comprises:
    aligning the top mica hard-board by placing the top mica hard-board having the second central hole in a parallel position with the bottom mica hard-board having the first central hole; and
    joining a free edge of the outer wall mica hard-board with an outer periphery of the top mica hard-board, and joining a free edge of the inner wall mica hard-board with an inner periphery of the too mica hard-board.

14. The method of claim 13, further comprising applying a binder to the bottom mica hard-board prior to positioning of the inner and outer wall mica hard-boards on the bottom mica hard-board.

15. The method of claim 14, further comprising applying a binder to the top mica hard-board prior to positioning of the top mica hard-board.

16. The method of claim 13, further comprising positioning the slot-liner between two laminations of an electrical machine.

* * * * *